United States Patent [19]

Nelson et al.

[11] 4,106,649

[45] Aug. 15, 1978

[54] FLOATING GRAIN BIN EXTENSION FOR USE WITH AGRICULTURAL COMBINE

[75] Inventors: John P. Nelson, Independence; Roger D. Hanaway, Blue Springs, both of Mo.

[73] Assignee: Allis-Chalmers Corporation, Milwaukee, Wis.

[21] Appl. No.: 826,751

[22] Filed: Aug. 22, 1977

[51] Int. Cl.² .............................................. B60P 1/42
[52] U.S. Cl. .................................. 214/522; 214/17 C;
53/59 R
[58] Field of Search ............ 214/17 C, 17 CA, 83.26,
214/83.32, 520, 521, 522; 53/59 R

[56] References Cited
U.S. PATENT DOCUMENTS

| | | | |
|---|---|---|---|
| 2,365,240 | 12/1944 | Arnold | 214/17 C X |
| 3,728,849 | 4/1973 | Lundahl | 214/83.26 X |
| 4,008,819 | 2/1977 | Hanaway | 214/522 |

*Primary Examiner*—Albert J. Makay
*Attorney, Agent, or Firm*—Robert C. Sullivan

[57] ABSTRACT

A grain bin adapted to be mounted on the upper part of an agricultural combine is provided with at least one "floating" bin side wall extension which is automatically movable into substantially vertical grain-retaining position as the bin approaches and reaches a full condition. Clean grain which has been separated from the straw, chaff or the like is conveyed by an elevating conveyor which discharges the grain via a chute into the intake end of an elongated "floating" bin loading conveyor which is pivotally mounted for angular movement in a vertical plane. In the illustrated embodiment, the bin loading conveyor is an auger conveyor and the rotatable shaft of the floating auger conveyor is driven by a suitable drive means through a universal joint. As the grain level in the grain bin approaches a full condition, the bin loading conveyor moves angularly upwardly from a horizontal position due to an upward thrust on the bin loading conveyor caused by the reaction of the grain discharging from the bin loading conveyor against the upper surface of the already loaded grain. In the illustrated embodiment, a pair of oppositely disposed bin side wall extensions are hingedly connected to the fore and aft walls of the upper edges of the grain bin, the bin wall extensions normally being folded downwardly in a lowered position. The respective bin wall extensions are connected by suitable link means to the floating bin loading conveyor whereby upward pivotal movement of the loading conveyor, as the level of the grain in the bin approaches a full condition, causes the bin wall extensions to be swung upwardly about their hinge connections into a vertical grain-retaining position. When the grain bin is unloaded, the hinged bin wall extensions move downwardly with the pivoted bin loading conveyor to a substantially horizontal lowered position.

17 Claims, 9 Drawing Figures

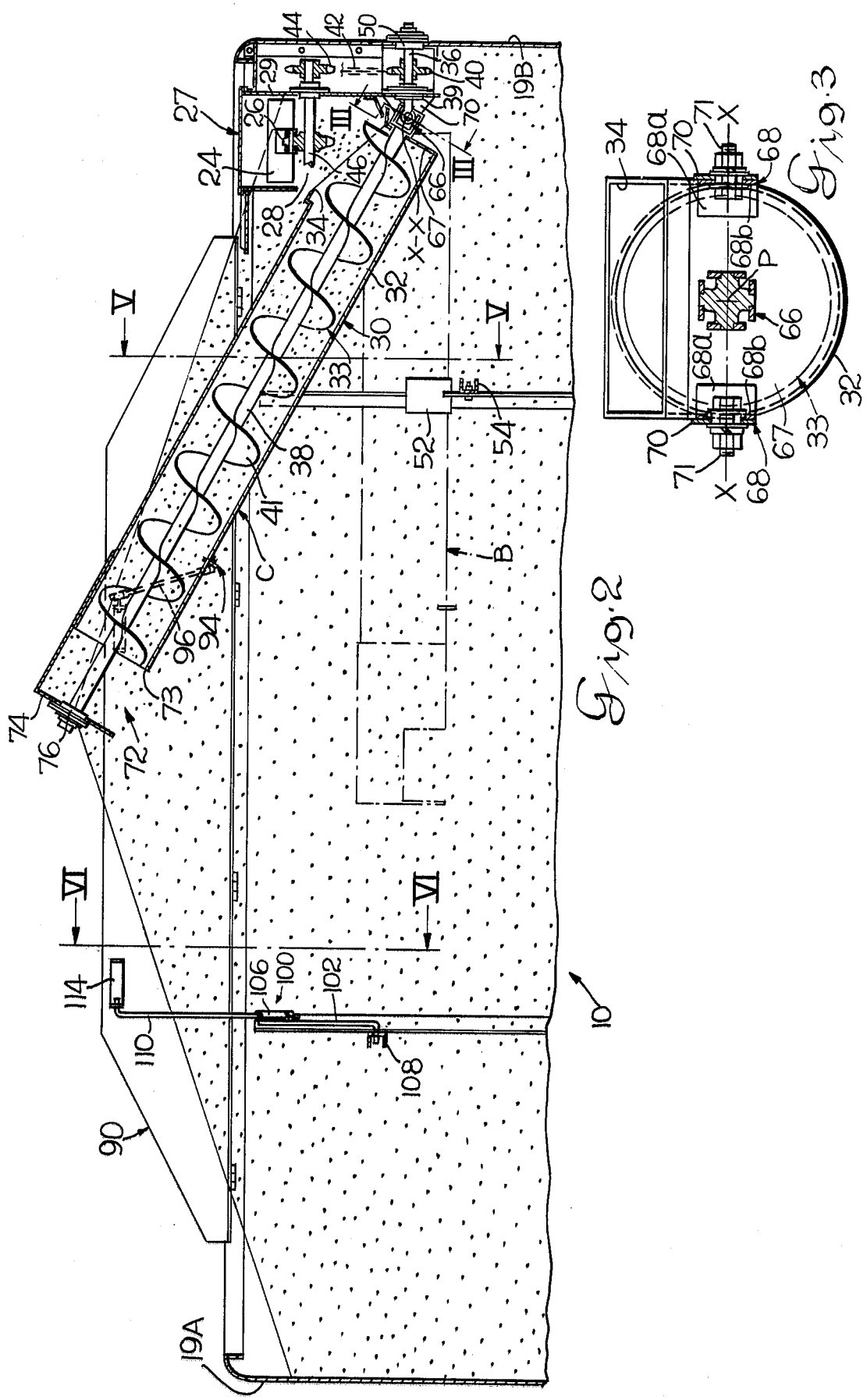

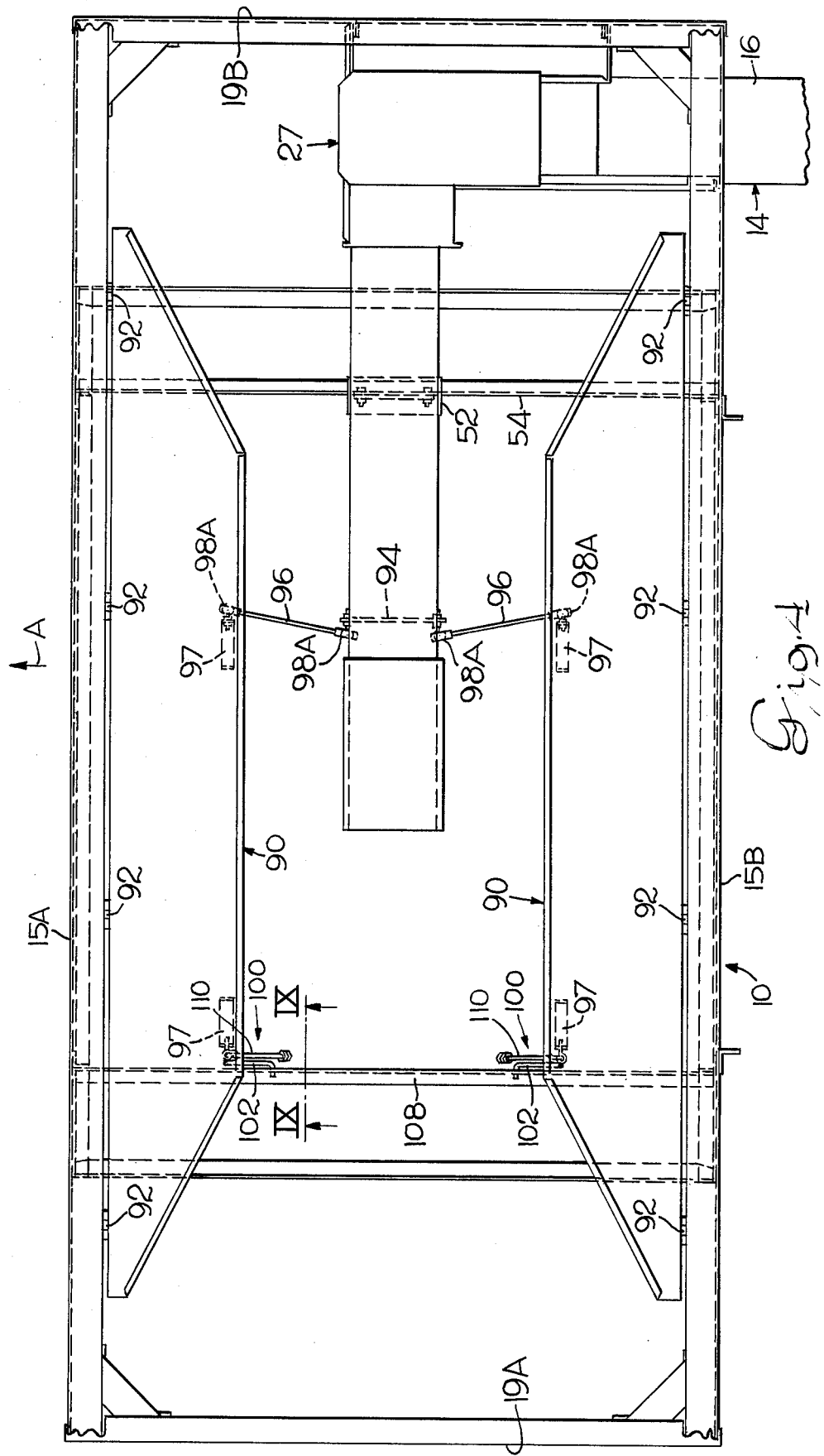

FLOATING GRAIN BIN EXTENSION FOR USE WITH AGRICULTURAL COMBINE

BACKGROUND OF THE INVENTION

This invention relates to grain bins for use with agricultural combines and more particularly to extensions for the side walls of such grain bins which are automatically moved upwardly into vertical grain-retaining position as the level of the grain in the grain bin approaches and reaches a full bin condition, which extensions are automatically retracted to a lowered position when the grain bin is unloaded.

DESCRIPTION OF THE PRIOR ART

It has been known in the prior art relating to grain bins for use with agricultural combines to provide bin side wall extensions for such grain bins which are manually positioned in a vertical grain-retaining position in order to increase the storage capacity of the grain bin and/or to prevent spillage of the heaped grain, with the bin wall extensions being held in such vertical position by mechanical securing or fastening means. In the prior art arrangement, the bin wall extensions remained in the raised vertical position until they were manually lowered by the operator by releasing the securing or fastening means which held the bin wall extensions in their raised vertical position.

In the prior art arrangement, when the grain bin extensions are in their raised vertical position, they cause the grain bin with the raised extensions to have a vertical height greater than that which is practical for the transporting and storage limits of the combine. Hence, in the prior art arrangement when the grain bin is not in use and before transporting or storing the combine, the grain bin extensions should be folded down into a retracted position. However, a frequent problem in the prior art arrangement is that the operator may forget that the grain bin extensions are in their elevated vertical position and the operator may drive the combine with the raised grain bin extensions into a doorway, overhead wire, or a tree branch, possibly causing damage to the grain bin or to the objects impinged upon by the raised side wall extensions of the grain bin.

U.S. Pat. No. 4,008,819 issued to Roger D. Hanaway on Feb. 22, 1977, and U.S. Pat. No. 4,029,228 issued to J. Lyle Shaver on June 14, 1977, both show grain bins mounted on agricultural combines in which the grain is loaded into the bin by means of a self-raising bin loading auger conveyor which overlies the grain bin and which discharges the grain into the grain bin, with the bin loading auger conveyor in each of the aforementioned United States patents moving angularly upwardly about a pivotal axis from an initial horizontal position due to the reaction of the grain discharging from the bin loading auger conveyor with the upper surface of the already loaded grain which imparts an upward thrust to the pivotally mounted bin loading auger conveyor causing the auger conveyor to swing upwardly about its pivotal axis.

In accordance with the present invention, the upward motion of a bin loading conveyor of the general type disclosed in the aforementioned U.S. Pat. Nos. 4,008,819 to Hanaway and 4,029,228 to Shaver is utilized to move at least one grain bin side wall extension into vertical grain-retaining position as the level of the grain in the grain bin approaches a full condition, the downward movement of the bin loading conveyor of the general type disclosed in the Hanaway and Shaver patents just mentioned being used to lower the bin side wall extension or extensions when the grain bin is unloaded.

STATEMENT OF THE INVENTION

Accordingly, it is an object of the present invention to provide a temporary grain storage bin for use with agricultural combines in which the grain bin has one or more bin side wall extensions which are automatically moved upwardly into vertical grain-retaining position as the level of the grain in the grain storage bin approaches and reaches a full condition, and in which the grain bin wall extension or extensions are automatically retracted into lowered position as the grain bin is unloaded.

It is a further object of the invention to provide a grain storage bin for use with an agricultural combine in which the grain bin is provided with at least one side wall extension which is automatically moved upwardly to vertical grain-retaining position by the angularly upward movement of a pivotally mounted grain bin loading conveyor as the grain level in the bin approaches a filled condition, and in which the bin side wall extension is automatically lowered by the downward movement of the pivotally mounted bin loading conveyor when the grain bin is unloaded.

It is still a further object of the invention to provide a grain storage bin for use with an agricultural combine in which the grain bin is provided with at least one bin side wall extension which is automatically moved upwardly to vertical grain-retaining position by the angularly upward movement of a pivotally mounted grain bin loading conveyor which swings upwardly about a pivotal axis due to the reaction of the grain discharging from the bin loading conveyor with the upper surface of the already loaded grain, which reaction imparts an upward thrust to the bin loading conveyor.

It is another object of the invention to provide a grain storage bin for use with an agricultural combine, in which the grain bin is provided with at least one bin wall extension which is automatically raised into position only as required to contain the grain when the grain bin approaches a filled condition, whereby the combine reaches its maximum height only when the grain bin is filled.

It is still another object of the invention to provide a grain storage bin having one or more wall extensions which are automatically moved into elevated vertical grain-retaining position only when the grain bin approaches filled condition whereby to normally limit the maximum height of the combine, and whereby the maximum height of the combine is greater than the height of the combine cab only when the grain bin is full.

In achievement of these objectives, there is provided in accordance with an embodiment of the invention a grain bin adapted to be mounted on the upper part of an agricultural combine, the grain bin being provided with at least one "floating" bin side wall extension which is automatically movable into substantially vertical grain-retaining position as the grain bin approaches and reaches a full condition. Clean grain which has been separated from the straw, chaff or the like is conveyed by an elevating conveyor which discharges the grain via a chute into the intake en of an elongated "floating" bin loading conveyor which is pivotally mounted for angular movement in a vertical plane. In the illustrated embodiment, the bin loading conveyor is an auger conveyor and the rotatable shaft of the floating auger conveyor is driven by a suitable drive means through a universal joint. As the grain level in the grain bin approaches a full condition, the floating bin loading conveyor moves angularly upwardly from a horizontal position due to an upward thrust on the bin loading conveyor caused by the reaction of the grain discharging from the bin loading conveyor against the upper surface of the already loaded grain. In the illustrated embodiment, a pair of oppositely disposed bin side wall extensions are hingedly connected to the upper edges of the fore and aft walls of the grain bin, the bin wall extensions normally being folded downwardly in a lowered position. The respective bin wall extensions are connected by suitable link means to the floating bin loading conveyor whereby upward pivotal movement of the bin loading conveyor, as the level of the grain in the bin approaches a full condition, causes the bin wall extensions to be swung upwardly about their hinge connections into a vertical grain-retaining position. When the grain bin is unloaded, the hinged bin wall extensions move downwardly with the pivoted bin loading conveyor to a substantially horizontal lowered position.

BRIEF DESCRIPTION OF THE DRAWINGS

Further objects and advantages of the invention will become apparent from the following description taken in conjunction with the accompanying drawings in which:

FIG. 2 is a view in vertical section taken along line II—II of FIG. 1;

FIG. 3 is a view taken in section along line III—III of FIG. 2;

FIG. 4 is a top plan view of the grain bin of FIGS. 1-3, inclusive, showing the pivotally movable bin loading auger conveyor and the grain bin extensions which are vertically movable by the movement of the bin loading auger conveyor;

DESCRIPTION OF THE PREFERRED EMBODIMENT

Figure 1:
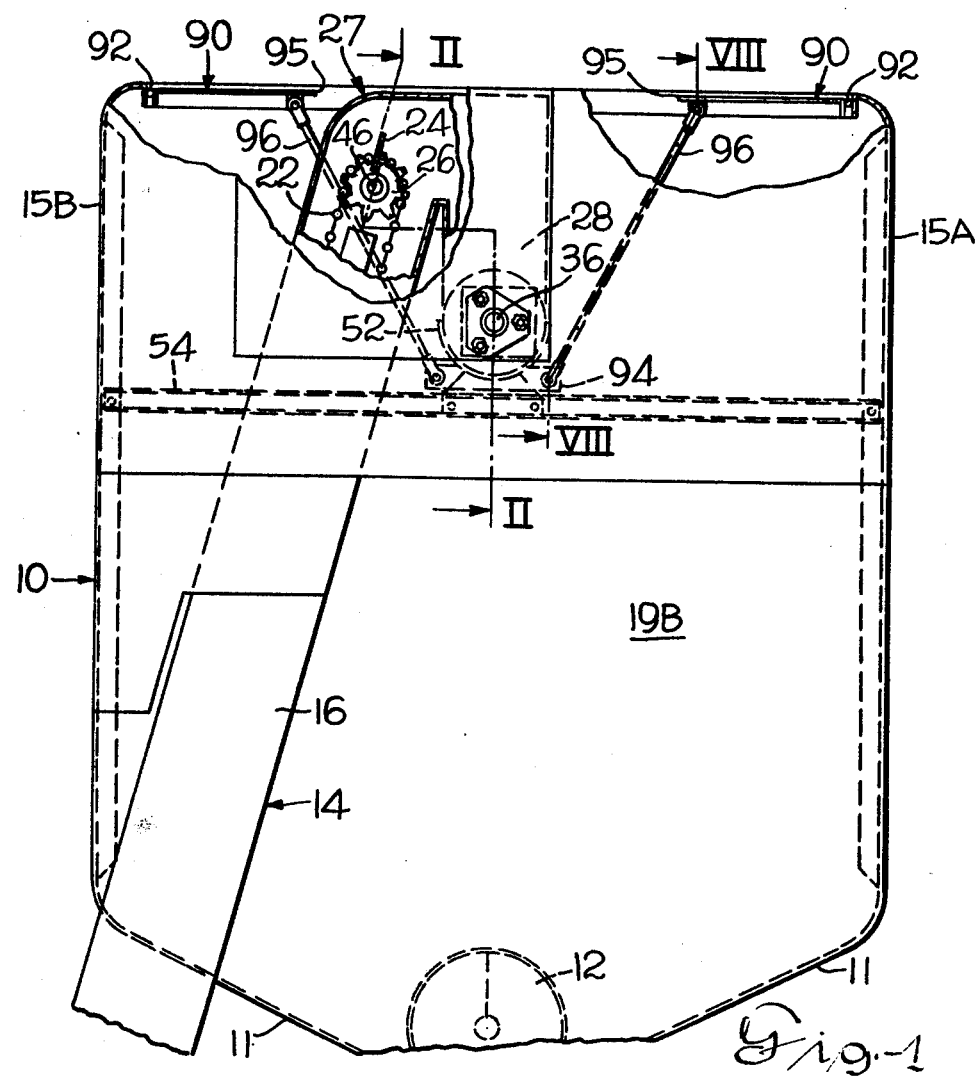
FIG. 1 is a view in side elevation of a grain bin suitable for mounting on an agricultural combine and provided with an arrangement for automatically raising and lowering the side wall extensions of the grain bin in accordance with the changing level of the grain in the grain storage bin.

Referring now to the drawings, there is shown a grain bin generally indicated at 10 used for temporarily storing grain harvested by an agricultural combine and adapted to be mounted in any suitable manner on the combine. Grain bin 10 is provided with a downwardly tapered bottom portion indicated at 11. The lower portion 11 of grain bin 10 is provided with an unloading auger 12 for discharging grain stored in the grain bin at appropriate intervals into attendant vehicles.

In its upper portion, grain bin 10 is of rectangular shape and includes a pair of oppositely disposed fore and aft walls indicated at 15A and 15B, respectively, which extend in a direction transverse of the direction of travel of the combine, and a pair of oppositely disposed side walls 19A and 19B which extend in a direction parallel to the direction of travel of the combine on which grain bin 10 is mounted. The direction of travel of the combine is indicated by the arrow marked "A" in the view of FIG. 4.

The combine on which grain bin 10 is mounted is provided with an appropriate grain separating mechanism, not shown, which separates the grain from the straw, chaff or the like. The cleaned grain is deposited at a collecting station contiguous the lower portion of the combine structure, from whence the grain is delivered by an auger type conveyor or the like (not shown) to the lower end of a clean grain elevator generally indicated at 14. The clean grain elevator 14 comprises a closed housing 16, normally of rectangular cross-section, within which the conveyor flights 24 (FIGS. 1 and 2) of a grain elevator move upwardly, housing 16 extending upwardly at an inclination as viewed in FIG. 1. Clean grain elevator housing 16 passes upwardly into a housing generally indicated at 27 (FIGS. 1, 2 and 4) which is suitably mounted in the upper portion of grain bin 10.

The function of housing 27 is to suitably enclose the upper end of clean grain elevator 14 and its housing 16 as well as to enclose grain chute 28 which delivers grain discharged by clean grain elevator 14 to a pivotally mounted grain bin loading auger conveyor generally indicated at 30 as will be explained in more detail hereinafter.

The general arrangement of grain bin 10, clean grain elevator 14, housing 27, grain chute 28, and bin loading auger conveyor 30 are all generally, although not necessarily exactly, similar to the similarly numbered elements described in the aforementioned U.S. Pat. No. 4,008,819 issued to Roger D. Hanaway. In the present disclosure there is no separate fixed grain bin extension as indicated at 10B in the aforementioned U.S. Pat. No. 4,008,819.

Clean grain elevator 14 includes a suitable chain 22 having conveyor flights 24 which support the grain being elevated by clean grain elevator 14. A drive sprocket (not shown) which is driven by a suitable driving mechanism drivingly engages the lower end of chain 22. The upper end of chain 22 passes around an idler sprocket 26 which is suitably mounted on an idler shaft 46 at the opposite or upper end of grain elevator 14, whereby conveyor chain 22 carrying flights 24 may elevate the clean grain picked up at the lower end of clean grain elevator 14 and carry it to the upper end of clean grain elevator 14, at which point the clean grain is discharged through a suitable opening in housing 16 of the clean grain elevator and into the vertical chute generally indicated at 28 which delivers the clean grain thus discharged from grain elevator 14 into the upwardly open end portion 34 of auger tube 32 of a pivotally mounted or floating auger conveyor generally indicated at 30.

A relatively short, horizontal, rotatable drive shaft 36 projects laterally through and outwardly beyond lateral side wall 29 of housing 27 and is provided with a driven sprocket 40 which is driven through a chain 42 trained around an idler sprocket 44 mounted on idler shaft 46 on which idler sprocket 26 of clean grain elevator 14 is fixed. Thus, horizontal drive shaft 36 is driven by idler shaft 46 through sprocket 44, chain 42, and sprocket 40 fixed to the outer end of drive shaft 36.

Drive shaft 36 is supported by a suitable bearing 39 where shaft 36 passes through wall 29 and into the interior of housing 27, drive shaft 36 extending for a short distance into the interior of housing 27 for connection to a universal drive connection such as universal joint 66 as will be described more fully hereinafter. The outboard end (i.e., the right-hand end in FIG. 2) of rotatable drive shaft 36 which lies laterally outwardly beyond housing 27 is supported by a suitable bearing 50 which in turn is suitably supported by the grain bin structure.

A floating bin loading auger conveyor generally indicated at 30 is provided which is pivotally movable in a vertical plane and comprises an elongated cylindrical auger tube 32 which houses a rotatable grain feed auger generally indicated at 33. Grain feed auger 33 comprises a rotatable shaft 38 and a helical auger 41 which is fixed to rotatable auger shaft 38 and rotates therewith.

The right-hand end of floating auger conveyor 30 relative to the view shown in FIG. 2, extends into the interior of housing 27 and in underlying relation to chute 28, whereby opening 34 in the upper surface of floating auger tube 32 contiguous the right-hand end of auger tube 32 (relative to the view of FIG. 2) is positioned to receive grain discharged from clean grain elevator 14 into chute 28.

Rotatable drive shaft 36 projects laterally beyond bearing 39 which supports shaft 36 for rotation and into the interior of the lower part of housing 27, where the end of rotatable shaft 36 is connected by a universal connecting means, such as the universal joint generally indicated at 66 (FIGS. 2 and 3), to rotatable shaft 38 of auger 33, whereby rotation of horizontal drive shaft 36 is imparted to shaft 38 of auger 33 in any of the various angular positions in a vertical plane which floating auger conveyor 30 may assume about horizontal pivotal axis X—X (FIGS. 2 and 3). The right-hand end wall 67 (FIG. 2) of auger tube 32 is suitably apertured to permit passage therethrough of the end of rotatable auger shaft 38 which is secured to universal connecting means 66.

As best seen in FIG. 3, the generally cylindrical-shaped (except for the intake end 34 thereof) floating auger tube 32 is suitably supported for pivotal movement on contiguous stationary bin structure in such manner that floating auger tube 32 may pivotally move in a vertical plane about the horizontal pivotal axis X—X (FIGS. 2 and 3) which coincides with the pivot point or center P of the universal drive connection such as universal joint 66. Thus, auger tube 32 and, hence, helical auger 33 mounted therein, may move in a vertical plane from a horizontal position such as that indicated at B (FIG. 2) to an angularly inclined position such as that indicated at C (FIG. 2). More specifically, as best seen in FIG. 3, the radially extending right end wall 67 (FIGS. 2 and 3) of pivotally mounted auger tube 32 has suitably secured thereto one leg 68a of each of a pair of spaced angle members, each respectively indicated at 68. The other leg 68b of each angle member 68 is pivotally connected along the horizontal axis X—X to a corresponding one of a pair of bracket arms 70 which are rigidly secured, as by welding, to the inside surface of wall 29 of housing 27. Suitable pivot bolts 71 extend in a horizontal plane along axis X—X through suitable aligned clearance apertures in each angle arm 68b and through its corresponding support bracket arm 70 whereby to permit pivotal movement of auger tube 32 about the horizontal axis X—X which passes through the pivot point or center P of universal drive connection 66.

A discharge end portion generally indicated at 72 (FIG. 2) is suitably connected to the laterally innermost or left-hand end relative to the view of FIG. 2 of floating auger tube 32. Discharge end portion 72 is provided at its left-hand end relative to the view of FIG. 2 with a radially inwardly extending wall portion 74 which supports a bearing 76 in which the inboard end (or left-hand end relative to FIG. 2) of rotatable auger shaft 38 is journalled for rotation. Discharge end portion 72 of auger tube 32 is provided with a large substantially downwardly directed opening 73 therein at the under portion thereof through which grain which has been propelled through pivotally mounted floating auger tube 32 drops into grain bin 10.

When grain bin 10 is empty and until the level of the grain in grain bin 10 reaches a level contiguous the under surface of auger conveyor 30 in the horizontal position indicated in phantom at B in FIG. 2, the pivotally mounted auger conveyor 30 will remain in the substantially horizontal position as indicated in phantom at B in FIG. 2 with the under surface of cylindrical auger tube 32 resting on and being received by the stop member 52 which is suitably mounted on a horizontal channel member 54 which extends in the force and aft dimension of bin 10. Channel member 54 is supported at its opposite ends by oppositely disposed vertical channel members 17A and 17B which are respectively positioned contiguous the fore and aft walls 15A and 15B, respectively, of grain bin 10. Auger conveyor 30 is substantially centrally located relative to the left-to-right dimension of grain bin 10 relative to the views of FIGS. 1 and 5 (i.e., substantially centrally of the dimension of the grain bin 10 which extends between fore and aft walls 15A and 15B of grain bin 10. Auger tube 32 of the pivotally movable auger conveyor 30 extends laterally inwardly from a location contiguous but spaced laterally inwardly from the right-hand lateral side wall 29 (as viewed in FIG. 2) of housing 27, auger tube 32 projecting into overlying relation to the hollow interior of the hollow space defined by grain bin 10. As will be explained hereinafter in more detail, as the level of the grain in the bin rises substantially to the level of the discharge opening 73 of auger tube 32, the reaction force of the grain being discharged from discharge opening 73 of auger tube 32 against the surface of the grain already deposited in the grain bin produces an upward thrust on the pivotally mounted loading auger conveyor 30 which causes auger conveyor 30 to begin to move upwardly with the increasing level of the grain in bin 10.

A pair of oppositely disposed grain bin side wall extensions each indicated at 90 are suitably hingedly connected by means of hinges 92 to inwardly turned portions of the upper ends of the respective opposite fore and aft walls 15A and 15B of grain bin 10.

Figure 5:
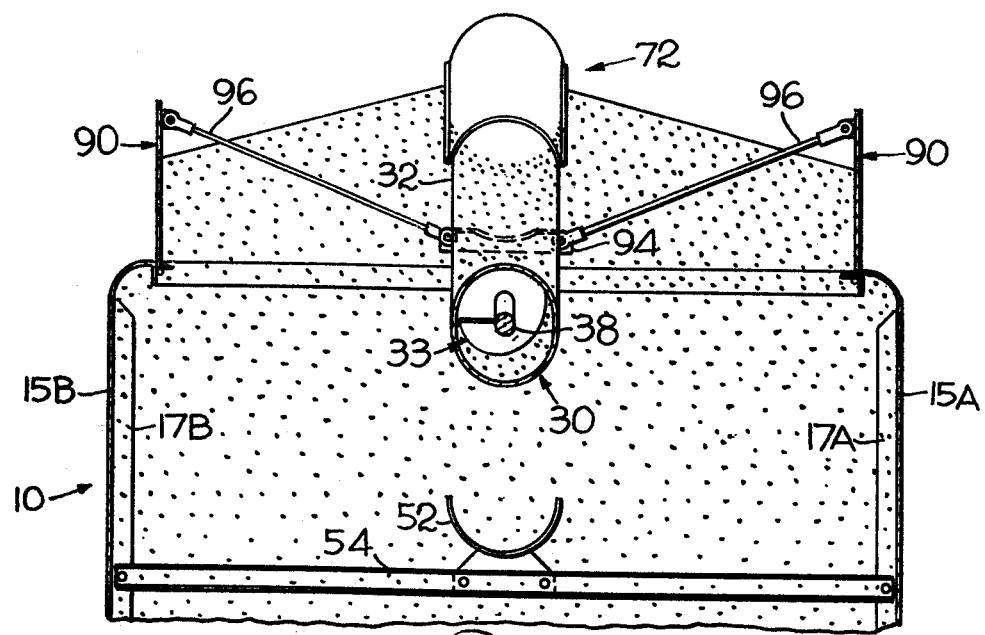
FIG. 5 is a view taken in section along line V—V of FIG. 2.
Figure 7:
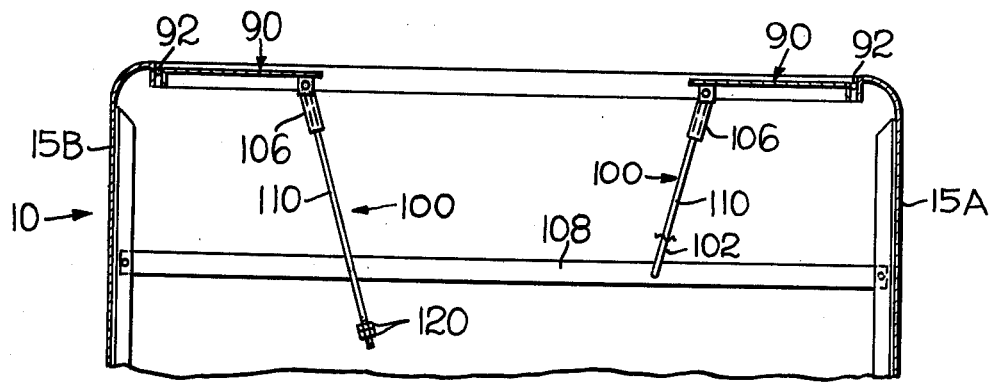
FIG. 7 is a view similar to FIG. 6 but showing the grain bin extensions in downwardly retracted substantially horizontal position.
Figure 6:
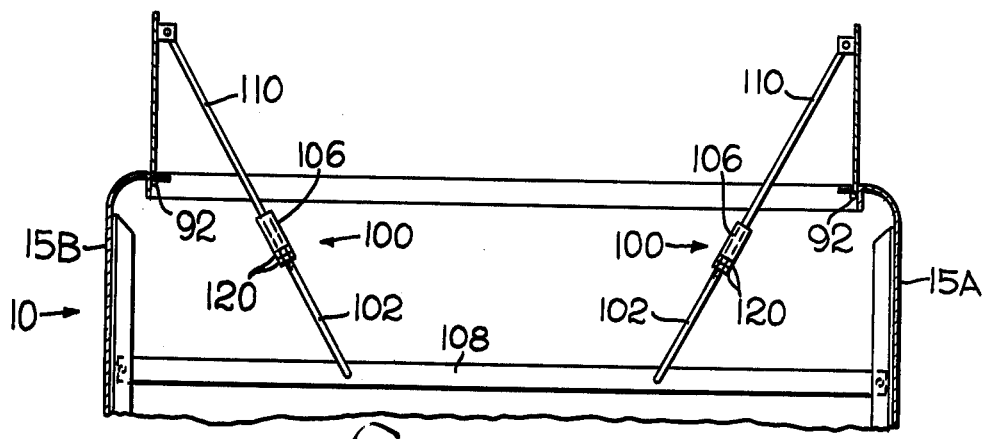
FIG. 6 is a view in section taken along line VI—VI of FIG. 2 and showing the grain bin extensions in elevated vertical position.

Due to the rectangular cross-section of grain bin 10 in accordance with which fore and aft walls 15A and 15B of the grain bin are substantially longer than opposite longitudinal walls 19A and 19B, there is a tendency for the grain deposited in grain bin 10 by bin loading auger conveyor 30 to become heaped up contiguous fore and aft walls 15A and 15B. This heaping of the grain does not occur contiguous the longitudinal walls 19A and 19B of the grain bin. Hence, there is a need to have the grain bin wall extensions 90 positioned contiguous fore and aft bin walls 15A and 15B, whereas in the illustrated embodiment, such grain bin wall extensions are not required contiguous longitudinal walls 19A and 19B. Side wall extensions 90 are movable from a normally downwardly retracted substantially horizontal position as seen in FIGS. 1, 4 and 7 to a substantially vertical grain-confining position as seen in FIGS. 2, 5 and 6. Grain bin side wall extensions 90 are mechanically interconnected with floating auger conveyor 30 as will be described in more detail in such manner that when bin loading auger conveyor 30 is in its lowered position as indicated in phantom at B in FIG. 2 or as indicated in full line in FIG. 4, grain bin side wall extensions 90 are in the downwardly retracted horizontal position seen in FIGS. 1, 4 and 7, in which the horizontally extending side wall extensions 90 lie in substantially the same horizontal plane as the upper surface of the roof of the cab of the combine. When bin loading auger conveyor 30 is in the elevated position shown in full line at C in FIG. 2, grain bin side wall extensions 90 are in the grain-retaining elevated vertical position shown in FIGS. 2, 5 and 6 of the drawings.

A plate member generally indicated at 94 is welded or otherwise suitably secured to the under surface of cylindrical auger tube 32 contiguous but spaced inboard a short distance from discharge end portion 72 of the auger tube. A connecting rod 96 is connected between each grain bin side wall extension 90 and plate member 94 at a corresponding opposite end of plate member 94 by means of ball joint connections each respectively generally indicated at 98. A ball joint connection 98 is provided at each end of each of the connecting rods 96 between the plate member 94 carried by cylindrical auger tube 32 and the corresponding grain bin side wall extension 90. The ball joint 98 of each connecting rod 96 is pivotally connected to its corresponding grain bin side wall extension 90 by means of a bracket 97 secured to the under surface of the respective side wall extension 90 contiguous laterally innermost edge 95 of the respective side wall extension 90 (as viewed in the horizontal position of the side wall extensions 90).

Figure 8:
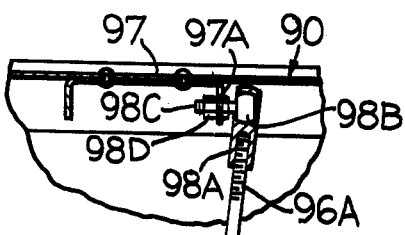
FIG. 8 is a view in section along line VIII—VIII of FIG. 1.

Referring to FIG. 8, there is shown the structure of the ball joint connections 98 at the opposite ends of one of the connecting rods 96, it being understood that both connecting rods 96 are similar to each other and that each connecting rod 96 is connected in a similar manner as the other connecting rod 96 to auger tube 32 and to a corresponding bin side wall extension 90. Connecting rod 96 is threaded at each of its opposite ends as indicated at 96A, the oppositely disposed threaded ends each being engaged with a threaded passage in a corresponding socket member 98A of the ball joint 98. Each socket member 98A serves as a bearing for a ball member 98B which has a stud portion 98C projecting therefrom. The stud portion 98C of the ball joint 98 at the upper end of rod 96 extends through a passage in leg 97A of the bracket 97 which is secured to the inner surface of bin side wall extension 90. A nut member 98D threadedly engages a threaded outer portion of stud portion 98C to secure stud portion 98C in place with respect to bracket 97, and, thus, to secure ball joint 98 to side wall extension 90. In a similar manner, stud portion 98C of ball joint 98 at the lower end of rod 96 extends through a passage in plate 94 which is secured to the under surface of auger tube cylinder 32, and a nut member 98D threadedly engages a threaded outer portion of stud portion 98C to secure stud portion 98C in place with respect to plate 94 carried by auger tube cylinder 32.

A further feature of the construction is the means which is provided to limit the upward swinging motion of the respective grain bin side wall extensions 90 to the vertical position shown in FIGS. 2, 5 and 6, and which also serves as a guide means for the respective grain bin side wall extensions 90 in the raising and lowering vertical movement of bin side wall extensions 90. Thus, there is provided a motion limiting and guide means generally indicated at 100 for each of the grain bin side wall extensions 90, comprising a rod member 102 having the lower end thereof bent at right angles to the main portion of the length of the rod member 102 as indicated at 104. Motion limiting and guide means 100 is connected to its corresponding side wall extension 90 at a location spaced a considerable distance along the bin side wall extension from the location of the connection of connecting rod 96. The upper end of rod 102 has rigidly secured thereto as by welding a tubular guide member 106. The bent portion 104 of rod 102 extends through a clearance aperture in a horizontal channel member 108 whereby to mount rod 102 for pivotal movement with respect to channel 108. Channel 108 extends in the fore and aft dimension of the grain bin and is suitably supported by vertical channel members which are positioned contiguous the fore and aft walls 15A and 15B of the grain bin. A cotter pin extends through an aperture in bent portion 104 of rod 102 to retain bent portion 104 in position with respect to channel 108. A second rod member 110 is provided which includes a right angle bent portion 112 at the upper end thereof which extends through a clearance aperture in leg 116 of a bracket member 114 which is rigidly secured to the inside surface of bin wall extension 90 contiguous edge 95 of bin wall extension 90. The opposite end of rod 110 is threaded as indicated at 118 and nut members 120 are threaded onto the threaded portion 118 of rod 110.

Figure 9:
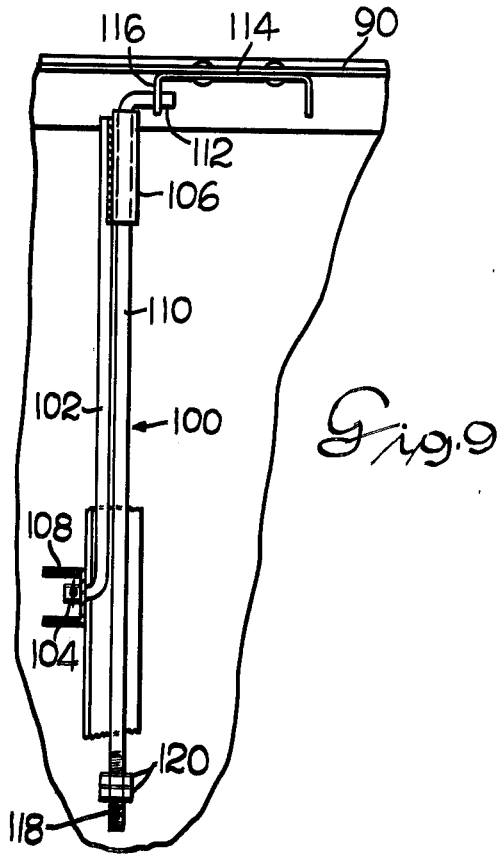
FIG. 9 is a view in section along line IX—IX of FIG. 4.

When each respective grain bin side wall extension 90 is horizontally positioned as shown in 4, 7 and 9, the rod 110, which is connected to bracket 114 on the bin side wall extension 90, projects through tubular guide 106 carried by rod 102 and extends to a level below that of channel member 108 as best seen in FIG. 9. When the respective side wall extension 90 swings to a vertical position as shown in FIGS. 2, 5 and 6, due to the upward pivotal movement of bin loading auger conveyor 30, rod 110 attached to side wall extension 90 slides upwardly through tubular guide portion 106 carried by rod 102 and reaches a final limiting position as seen in the view of FIG. 6 in which nut members 120 abut against the lower end of the tubular guide portion 106 carried by rod 102 to limit the swinging movement of side wall extension 90 to the vertical position seen in FIG. 6.

As rod member 110 slides through tubular guide portion 106 during the movement of bin side wall extension 90 from a horizontal to a vertical position, rod 102 swings pivotally about a horizontal axis due to the pivotal connection of lower end portion 104 of rod 102 relative to channel 108.

SUMMARY OF OPERATION

When grain bin 10 is empty and until the level of the grain in grain bin 10 reaches a level contiguous the under surface of bin loading auger conveyor 30, the pivotally mounted bin loading auger conveyor 30 will remain substantially in the horizontal position indicated at B in the phantom view of FIG. 2, in which auger tube 32 rests on stop member 52 mounted on channel 54.

As the level of the grain discharged into grain bin 10 rises substantially to the level of the discharge opening 73 of auger tube 32, the reaction force of the grain being discharged through discharge opening 73 against the grain already deposited in grain bin 10 imparts an upward thrust force to the under surface of discharge end 72 of the pivotally mounted bin loading auger conveyor 30, causing auger conveyor 30 to swing upwardly about its pivotal connection about horizontal axis X-X as the level of the grain in bin 10 increases, with at least the discharge end of floating auger tube 32 always resting substantially on the upper surface of the accumulated grain in grain bin 10.

When auger conveyor 30 is in the substantially horizontal position indicated at B in FIG. 2 in which auger tube 32 rests against stop member 52, the two oppositely disposed bin side wall extensions 90 are in the downwardly retracted horizontal position shown in FIGS. 1, 4 and 7. However, as the pivotally mounted auger conveyor 30 swings angularly upwardly to ultimately assume a maximum pivotally inclined position such as that indicated at C in FIG. 2 due to the increasing level of grain in grain bin 10, the mechanical connection between pivoted auger conveyor 30 and the opposite bin side wall extensions 90 provided by connecting rod members 96 causes bin side wall extensions 90 to swing from their horizontal position shown in FIGS. 1, 4 and 7 to approach and finally reach the vertical position shown in FIGS. 2, 5 and 6, assuming that the grain level rises sufficiently in the grain bin to cause the pivoted auger conveyor 30 to swing to the limiting position shown in FIGS. 2, 5 and 6.

Also, as previously explained, as grain bin side wall extensions 90 swing from their horizontal to their vertical position with the upward swinging movement of pivoted auger conveyor 30 as just explained, the motion limiting and guide arrangement generally indicated at 100 (FIGS. 6, 7 and 9) associated with each respective bin side wall extension and comprising rods 102 and 110, causes rod 110 to slide upwardly in tubular guide portion 106 carried by rod 102 until nut members 120 on threaded end 118 of rod 110 abut against the lower end of tubular guide portion 106 mounted on rod 102, to thereby limit any further upward swinging movement of the corresponding grain bin side wall extensions 90. Nut members 120 can be adjustably positioned on threaded end 118 of rod 110 to cause nut members 120 to abut against the lower end of tubular guide portion 106 when the corresponding bin side wall extension is in the vertical position shown in FIGS. 2, 5 and 6 to thereby limit any swinging movement of the respective bin side wall extension 90 beyond the vertical position.

When grain bin 10 is unloaded, pivoted auger conveyor 30 drops angularly downwardly about its pivotal axis X-X with the decreasing level of grain in the grain bin until auger conveyor 30 returns to the substantially horizontal position indicated at B in FIG. 2, where auger tube 32 comes to rest upon stop member 52. Further decrease in the level of the grain in bin 10 after auger conveyor 30 drops to the horizontal position indicated at B in FIG. 2 has no further effect upon the level of auger conveyor 30.

The movement of bin side wall extensions 90 to the raised vertical position shown in FIGS. 2, 5 and 6 when the grain level rises to the heaped condition shown in FIGS. 2 and 5 not only serves to retain the heaped up grain in the bin without spillage, but also the vertically raised condition of bin side wall extensions 90 serves as a signal to the driver of the attendant truck that grain bin 10 is ready to be unloaded.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a grain bin adapted to be mounted on an agricultural combine, a bin loading conveyor positioned in the upper portion of said grain bin, means for delivering grain to said bin loading conveyor, said bin loading conveyor being adapted to receive grain and to convey grain which it receives to a discharge outlet of said bin loading conveyor in overlying relation to the interior of said grain bin, support means supporting said bin loading conveyor for pivotal movement about a horizontal axis whereby said bin loading conveyor swings vertically upwardly or downwardly about said horizontal axis in accordance with the level of grain in said bin after the grain in said bin reaches a predetermined level, at least one bin wall extension for increasing the height of said bin in the region of said bin wall extension, said bin wall extension being normally positioned in a lowered position, and means connecting said bin wall extension to said bin loading conveyor whereby said bin wall extension is selectively moved upwardly to a raised grain-retaining position or is moved downwardly to said lowered position in accordance with the vertical movement of said bin loading conveyor.

2. The combination defined in claim 1 in which said discharge outlet of said bin loading conveyor is substantially downwardly directed and the reaction of grain discharged from said discharge outlet against the upper surface of the already loaded grain in said bin causes an upward thrust urging said bin loading conveyor to swing upwardly about its horizontal pivotal axis whereby to cause upward movement of said bin wall extension.

3. The combination defined in claim 2 in which the force of gravity causes said bin loading conveyor to move downwardly and causes the bin wall extension connected to said bin loading conveyor to return to said lowered position when the level of the grain in said bin decreases to said predetermined level.

4. The combination defined in claim 1 in which said bin wall extension is pivotally connected to a wall of said bin contiguous the upper end of said bin for movement about a substantially horizontal axis.

5. The combination defined in claim 1 in which said bin wall extension is pivotally movable from a substantially horizontal lowered position to a substantially vertical grain-retaining position.

6. The combination defined in claim 1 in which said bin loading conveyor is adapted to be connected to a drive means including a universal connecting means whereby said bin loading conveyor remains connected in driven relation to said drive means at changing angular positions of said bin loading conveyor relative to the horizontal plane, said support means supporting said bin loading conveyor for pivotal movement about a horizontal axis coincident with the center of said universal connecting means.

7. The combination defined in claim 1 in which said bin loading conveyor comprises an auger tube and a conveyor auger mounted for rotation in said auger tube.

8. The combination defined in claim 7 in which said conveyor auger is adapted to be connected to a drive means including a universal connecting means, and said auger tube is pivotally connected to said support means for pivotal movement about a horizontal axis coincident with the center of said universal connecting means.

9. The combination defined in claim 1 including means for preventing movement of said bin wall extension to a position beyond a vertical position upon the upward movement of said bin loading conveyor.

10. The combination defined in claim 1 including a connecting rod connecting said bin wall extension to said bin loading conveyor, and a corresponding ball joint connecting each of the opposite ends of said connecting rod respectively to said bin wall extension and to said bin loading conveyor.

11. The combination defined in claim 1 in which said grain bin is of rectangular cross-section contiguous the upper end thereof and includes a first pair of parallel fore and aft bin walls and a second pair of parallel longitudinal bin walls, the longitudinal axis of said bin loading conveyor lying in a vertical plane which is parallel to the vertical planes of said fore and aft bin walls, a corresponding bin wall extension connected to each of said fore and aft bin walls contiguous the upper end of the respective fore and aft bin walls, and means connecting each respective bin wall extension to said bin loading conveyor whereby both of said bin wall extensions are selectively moved in unison either upwardly to a raised grain-retaining position or downwardly to a lowered position in accordance with the vertical movement of said bin loading conveyor about its horizontal pivotal axis.

12. In combination, a grain bin adapted to be mounted on an agricultural combine, a bin loading conveyor positioned in the upper portion of said bin, means for delivering grain to said bin loading conveyor, said bin loading conveyor being adapted to receive grain and to convey grain which it receives to a substantially downwardly directed discharge outlet of said bin loading conveyor in overlying relation to the interior of said grain bin, said bin loading conveyor comprising an auger tube and an auger mounted for rotation in said auger tube, said auger being adapted to be connected to a drive means including a universal connecting means whereby said auger remains connected in driven relation to said drive means at changing angular positions of said bin loading conveyor relative to the horizontal plane, support means supporting said auger tube for pivotal movement about a horizontal axis coincident with the center of said universal connecting means, whereby said bin loading conveyor swings vertically upwardly or downwardly about said horizontal axis in accordance with the level of grain in said bin when the grain in said bin is above a predetermined level, at least one bin wall extension for increasing the height of said bin in the region of said bin wall extension, said bin wall extension being normally positioned in a lowered position, means connecting said bin wall extension to said bin loading conveyor whereby said bin wall extension is selectively moved upwardly to a raised grain-retaining position or is moved downwardly to said lowered position in accordance with the vertical movement of said bin loading conveyor, the reaction of the grain being discharged from said discharge outlet of said bin loading conveyor against the upper surface of the already loaded grain in said bin causing an upward thrust urging said bin loading conveyor to swing upwardly about its horizontal pivotal axis whereby to cause upward movement of said bin wall extension toward a substantially vertical position, the force of gravity causing said bin loading conveyor to move downwardly and causing the bin wall extension connected to said bin loading conveyor to return to said lowered position when the level of the grain in said bin decreases to said predetermined level.

13. The combination defined in claim 12 in which said bin wall extension is pivotally connected to a wall of said bin contiguous the upper end of said bin for movement about a substantially horizontal axis.

14. The combination defined in claim 13 in which said bin wall extension is pivotally movable from a substantially horizontal lowered position to a substantially vertical grain-retaining position.

15. The combination defined in claim 12 including means for preventing movement of said bin wall extension to a position beyond a vertical position upon the upward movement of said bin loading conveyor.

16. The combination defined in claim 12 including a connecting rod connecting said bin wall extension to said bin loading conveyor, and a corresponding ball joint connecting each of the opposite ends of said connecting rod respectively to said bin wall extension and to said bin loading conveyor.

17. The combination defined in claim 12 in which said grain bin is of rectangular cross-section contiguous the upper end thereof and includes a first pair of parallel fore and aft bin walls and a second pair of parallel longitudinal bin walls, the longitudinal axis of said bin loading conveyor lying in a vertical plane which is parallel to the vertical planes of said fore and aft bin walls, a corresponding bin wall extension connected to each of said fore and aft bin walls contiguous the upper end of the respective fore and aft bin walls, and means connecting each respective bin wall extension to said bin loading conveyor whereby both of said bin wall extensions are selectively moved in unison either upwardly to a raised grain-retaining position or downwardly to a lowered position in accordance with the vertical movement of said bin loading conveyor about its horizontal pivotal axis.

* * * * *